(12) United States Patent
King

(10) Patent No.: US 12,533,273 B2
(45) Date of Patent: Jan. 27, 2026

(54) SELF LEVELING VACUUM CLEANER SYSTEM, DEVICE AND METHOD

(71) Applicant: James L. King, Bella Vista, AR (US)

(72) Inventor: James L. King, Bella Vista, AR (US)

( * ) Notice: Subject to any disclaimer, the term of this patent is extended or adjusted under 35 U.S.C. 154(b) by 310 days.

(21) Appl. No.: 18/503,098

(22) Filed: Nov. 6, 2023

(65) Prior Publication Data

US 2024/0065905 A1 Feb. 29, 2024

Related U.S. Application Data

(62) Division of application No. 17/169,506, filed on Feb. 7, 2021, now abandoned.

(60) Provisional application No. 63/093,603, filed on Oct. 19, 2020.

(51) Int. Cl.
| | | |
|---|---|---|
| *A61G 5/04* | (2013.01) | |
| *A47L 9/00* | (2006.01) | |
| *A47L 9/28* | (2006.01) | |
| *A47L 9/32* | (2006.01) | |
| *A47L 11/40* | (2006.01) | |
| *A61G 5/10* | (2006.01) | |

(52) U.S. Cl.
CPC .............. *A61G 5/047* (2013.01); *A47L 9/009* (2013.01); *A47L 9/2831* (2013.01); *A47L 9/2852* (2013.01); *A47L 9/325* (2013.01); *A47L 11/4011* (2013.01); *A47L 11/4061* (2013.01); *A47L 11/4066* (2013.01); *A61G 5/1051* (2016.11)

(58) Field of Classification Search
None
See application file for complete search history.

(56) References Cited

U.S. PATENT DOCUMENTS

| | | | |
|---|---|---|---|
| 2006/0156509 A1* | 7/2006 | Luebbering | A47L 9/0009 15/410 |
| 2019/0029486 A1* | 1/2019 | Suvarna | A47L 9/2857 |

* cited by examiner

*Primary Examiner* — Kaj K Olsen
*Assistant Examiner* — Pradhuman Parihar

(57) ABSTRACT

The present invention is a system, device, and method for use of a steerable tractor powered unit (STPU) comprising a vacuum cleaner mounted to a self-leveling platform coupled to a tactile joystick staff operable to control said steerable tractor powered unit, considerably reducing the effort required to operate said vacuum cleaner; a variety of vacuum cleaner types are adaptable for use with said STPU.

19 Claims, 5 Drawing Sheets

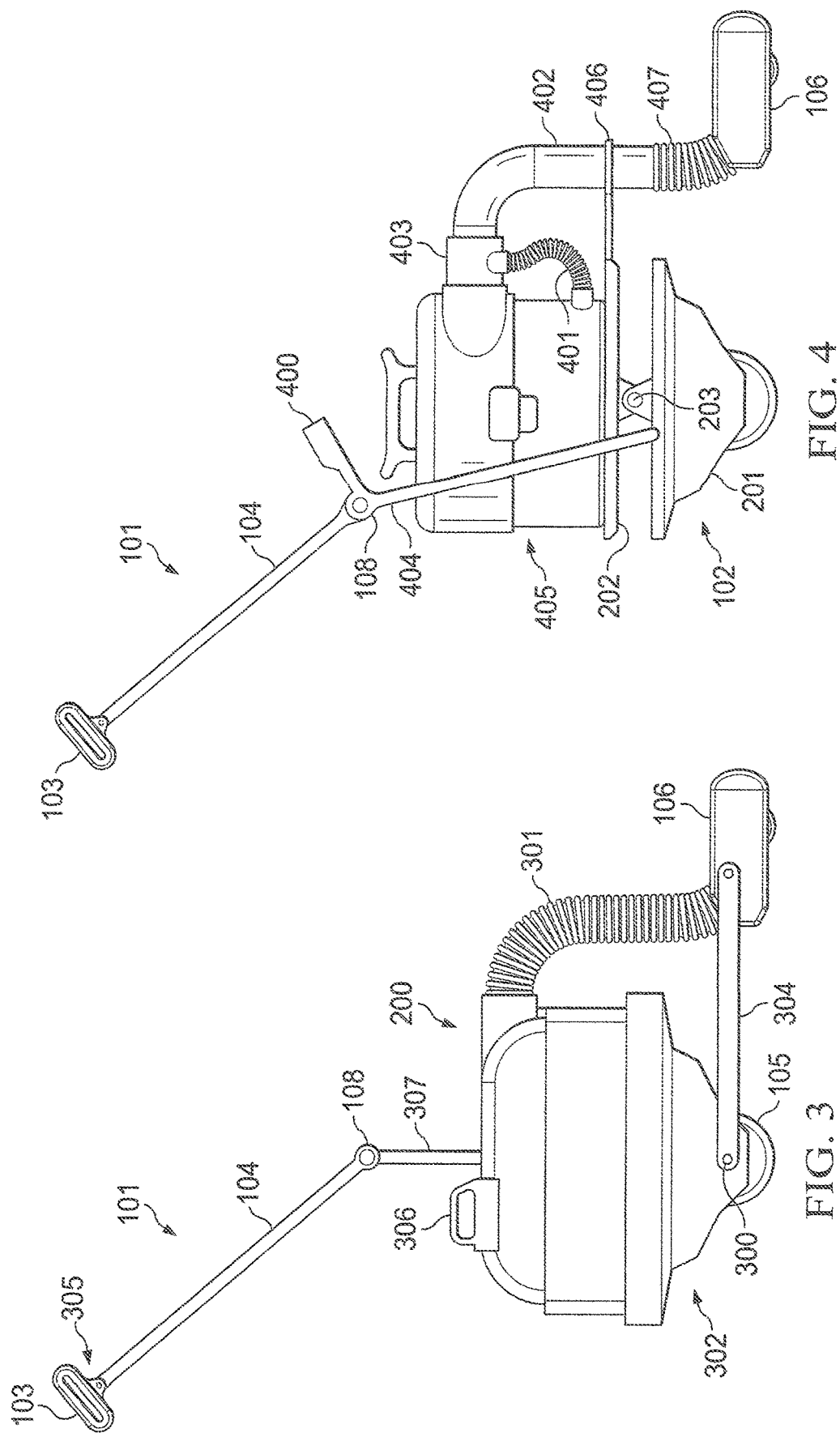

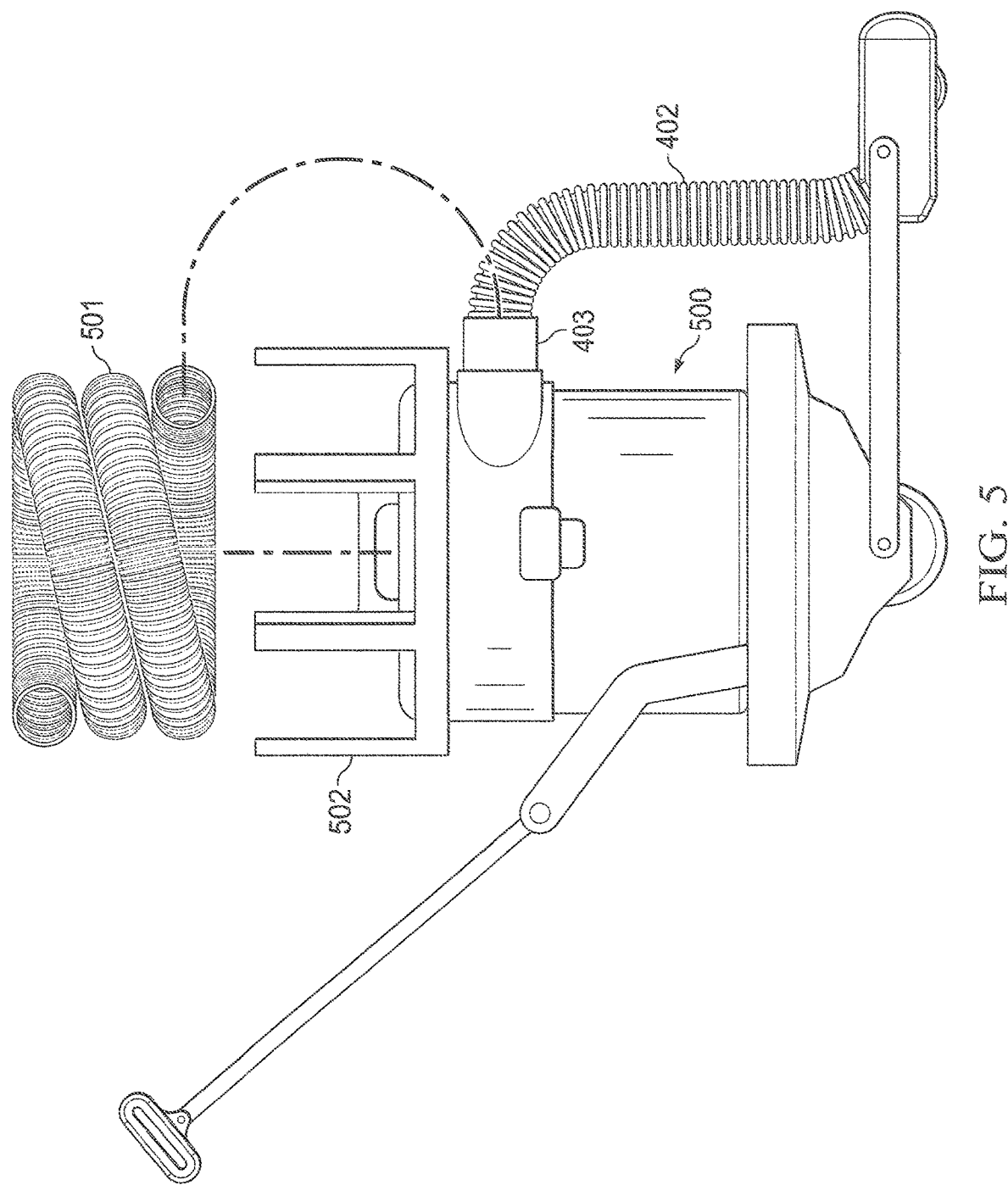

SELF LEVELING VACUUM CLEANER SYSTEM, DEVICE AND METHOD

CROSS REFERENCE TO RELATED APPLICATION

This application claims priority to U.S. Provisional Patent Application No. 63/093,603 file Oct. 19, 2020 titled TRACTOR DRIVEN ASSISTED MOBILITY SYSTEM, DEVICE AND METHOD and is a Divisional Application of co-pending U.S. Utility application Ser. No. 17/169,506 filed Feb. 7, 2021 titled SELF LEVELING VACUUM CLEANER SYSTEM, DEVICE AND METHOD.

TECHNICAL FIELD

The present invention relates to powered vacuum cleaners and other tools requiring significant user force to use or move and after-market accessories for the same.

BACKGROUND OF THE INVENTION

Vacuum cleaner refers to a tool designed to clean a space through suction of unwanted small debris and particulate into a removable container or bag to be emptied. There are different types of vacuum cleaner, differentiated by the type of material they are able to clean (wet, dry, or both) and by their size and/or geometry (handheld, upright, or canister), among other considerations.

Handheld vacuums are usually powered via rechargeable battery and are small and light enough to be lifted by one hand. A type of handheld vacuum, stick vacuums refer to a hybrid vacuum which can be converted from a handheld into a portable upright, albeit with reduced cleaning power and relying on the same rechargeable battery.

Upright vacuums usually consist of a brush housing containing a rotating brush, said brush housing being attached via a hinge or ball pivot to an upright portion comprising the motor, debris bag, and user controls. The fan and attached motor can be located upstream from the bag with dust passing directly through it or downstream from the bag and filter. Fan placement affects overall efficiency and effectiveness on certain surfaces, e.g., on carpet versus hard wood flooring. The rotating brush-roll can be driven by the suction motor or a separate motor. Upright vacuums are typically powered by direct connection to a wall outlet. Some models provide force-assistance in the direction of brush rotation (usually in the forward direction), after a user has provided the force to initiate motion.

Canister vacuums offload the weight of the suction motor, filters, and dust container/bag to a separate housing, so that the user only has to carry a vacuum head coupled via flexible hose to the canister unit. These vacuums have advantages in maneuverability in small spaces, but the combined unit and hose can be cumbersome and difficult to maneuver over large spaces.

Wet/dry vacuum cleaners, also known as shop vacs, are specialized vacuum units that can handle wet and dry debris.

These vacuums share in common that a user must provide some or all of the force required to both move a vacuum and maintain a good seal against the surface to be cleaned. This can quickly become fatiguing due to the weight of most vacuums and the repetitive motions involved in their use, and the posture needed to maintain downward force.

Additionally, some vacuums allow the user the option to switch the singular vacuum between the primary brush head unit and a secondary flexible hose, in order to clean corners, elevated, and other hard-to-reach places. Switching between said primary and secondary vacuum lines can be time-consuming and involve detaching hoses from the main unit and attaching add-ons stored elsewhere.

The present invention provides a system for adapting any of the above types of existing vacuum units so that it maintains a good seal against a surface without requiring additional user force and is capable of powered forward and backward motion with a minimum of user input, said system comprising a self-leveling platform device and method for attaching an existing vacuum unit to the same, including, if applicable, a diverter valve allowing for easier switching between primary and secondary vacuum lines.

In the co-pending related Patent Application to this application, US20060156509 to Luebbering and 20190029486 to Suvarna were cited as references. The present invention is patentably distinguishable from Luebbering and Suvarna. Luebbering is a hand-held vacuum that has a folding handle. It only has one motor for creating the vacuum. Luebbering fails to disclose or suggest a motor for propelling the invention across the floor. Luebbering does not disclose or suggest a self-leveling platform. Luebbering does not have a motor dedicated to propelling the unit. In the present invention, the lower section of a joystick is rigidly connected to an electronically self-leveling platform. The upper jointed section of the control rod of the present invention is used to push the rigid portion forward or pull it back to cause the electronics to perceive an unlevel force on the present invention's self-leveling platform. This force then results in turning on the propulsion motor to go forward ono backwards. In addition, the upper joint allows the operator to control steering the entire unit left or right. It also allows the operators to walk behind the unit and allows height adjustment. The upper joint is critical by allowing the operator to still simultaneously control steering and cause the self-leveling platform's braking forward or reverse motion. Suvarna is a debris detection system that counts and stores the number of particles that a robotic cleaner picks up in a given location. The purpose of this stored information is a recleaning can be undertaken if the quantity of debris exceeds a historical value.

SUMMARY OF THE INVENTION

The present invention is a system, device and method for adapting a vacuum cleaner (handheld, upright, stick, or canister type) into a powered tractor vacuum unit which maintains a good seal against a surface and is moveable and steerable with a minimum of user force input via mounting to a steerable tractor powered unit (STPU). Said steerable tractor powered unit (STPU) comprises a self-leveling platform (SLP) coupled to a tactile joystick staff (TJS), said SLP comprising a mounting platform corresponding to the desired existing vacuum unit to be mounted, drive wheel(s), driving motor(s), onboard processor, memory, control software, inertial measurement unit (IMU), and battery or external power supply, and TJS attachment point; said TJS comprising a tactile control rod and handle, user controls, and SLP attachment point. The self-leveling platform and associated onboard processor, memory, IMU, control software, drive wheel, and driving motor(s) function such that said SLP attempts to maintain a desired orientation (level platform) regardless of external forces; said external forces are provided by the user via the tactile joystick staff and its attachment point to the SLP. The SLP with attached vacuum cleaner being able to rotate about the drive wheel axis as a pivot acts as an inverted pendulum such that any external force which would tip it in a given direction must be compensated by the movement of the SLP in said direction in an attempt to balance said platform, said movement being determined via said onboard processor, IMU, and control software, and actuated via said driving motor(s) coupled to said drive wheel.

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting. For example, the vacuum units that are coupled or integrated with the SLP can be any vacuum used in a home or commercial setting or can be a wet or dry vacuum. The internal differences between the wet and dry vacuum are that the dry collection bag is removed, the collection container is water-proof and the fan and electrical connection are waterproof. Further, the floor facing cleaning head or brush head can be designed for any surface, such as wood, hardwoods, engineered hardwoods, vinyl flooring, shag rugs or carpets or non-shag rugs or carpets.

BRIEF DESCRIPTION OF THE DRAWINGS

For a better understanding of the present invention including the features, advantages and specific embodiments, reference is made to the following detailed description along with accompanying Figures, in which:

FIG. 3 is a side-view of an embodiment of the present invention adapting a cordless handheld vacuum and having an integrated self-leveling platform.

FIG. 4 is a side-view of an embodiment of the present invention adapting a wet/dry vacuum and having separated mounting and drive platforms.

FIG. 5 is a side-view of an embodiment of the present invention adapting a canister vacuum such that the entire canister is mounted on a self-leveling platform.

DETAILED DESCRIPTION

While the making and using of the disclosed embodiments of the present invention is discussed in detail below, it should be appreciated that the present invention provides many applicable inventive concepts which can be embodied in a wide variety of specific contexts. Some features of the preferred embodiments shown and discussed may be simplified or exaggerated for illustrating the principles of the invention.

Figure 1:
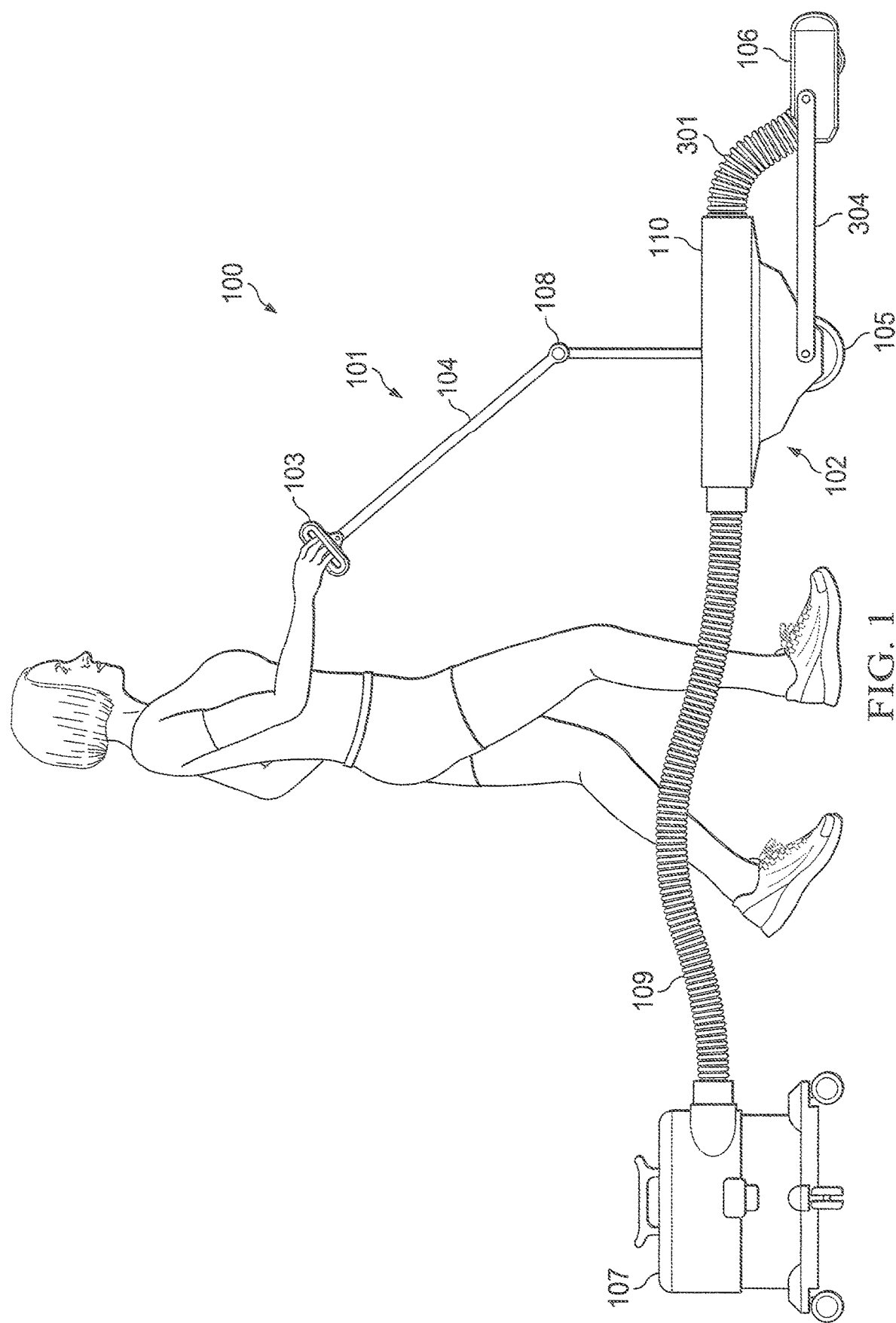
FIG. 1 is a side-view of an embodiment of the present invention adapting a canister vacuum such that only the brush head is mounted on the self-leveling platform.

Referring to FIG. 1, the invention is a system, device and method for use for adapting a vacuum unit (handheld 200, upright, stick 600, wet/dry 405 or canister type 107, 500) into a self-powered vacuum which maintains a good seal against a surface, including a wood, concrete or rug surface, due to the weight of the brush head and is moveable and steerable with a minimum of user force input via mounting to a steerable tractor powered unit (STPU) 100, said steerable tractor powered unit comprising a self-leveling platform (SLP) 102 coupled to a tactile joystick staff (TJS) 101. As seen in FIG. 1, pivoting connection bar 304 is interposed between SLP 102 and cleaner head 106. The purpose for this pivoting connection bar 304 is to restrain the cleaner head 106 and hold it a specified distance in front of SLP 102. In addition to a flexible hose 301 is placed between SLP 102 and cleaner head 106 to allow SLP 102 to freely tilt back and forth.

A generic vacuum unit comprises a suction motor coupled to a fan operable to pull air and dust through a suction opening, through an optional filter, and into a removeable bag or container. The order can be varied such that dust-laden air is pulled directly through said fan and then into a bag, or such that the dust-laden airstream is pulled through a filter and into a bag, depositing said dust and allowing the now clean airstream to continue to said fan.

In a preferred embodiment, said SLP comprises a mounting platform 202 corresponding to the desired vacuum unit (200, 405, 500, 600) to be mounted, a housing 201 comprising a single drive wheel 105, one or more driving motor(s) coupled to said drive wheel, onboard processor, non-volatile memory, control software in the form of a set of sequential instructions stored in said memory to be executed by said processor, inertial measurement unit (IMU) comprising sensors including one or more accelerometers and/or gyroscopes, a battery or external power supply, TJS pivot 108, and a swivel joint 203 coupling said mounting platform to said housing; said single drive wheel is positioned approximately in line vertically with the center of mass of the combined SLP, TJS, and vacuum unit; said drive wheel is oriented such that its axis of rotation is parallel to the ground and perpendicular to the forward/backward movement axis of the vacuum unit, relative to the user. Referring to FIG. 1, in another embodiment, the canister-type vacuum unit 107 is not mounted on the SLP but rests on the floor, said vacuum unit being coupled via a flexible hose 109 to a brush head 106 via manifold 110.

Figure 2B:
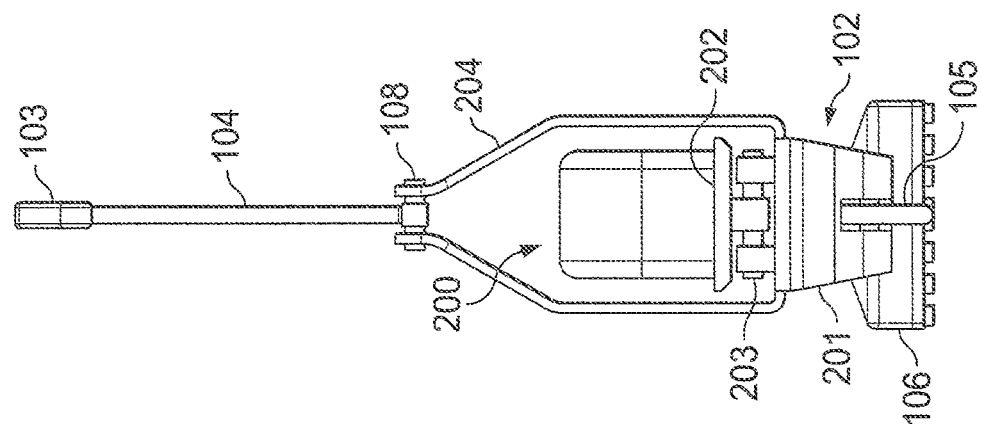
FIG. 2*b* is a rear view of the embodiment of the present invention of FIG. 2*a* adapting a cordless handheld vacuum and having separated mounting and drive platforms.
Figure 2A:
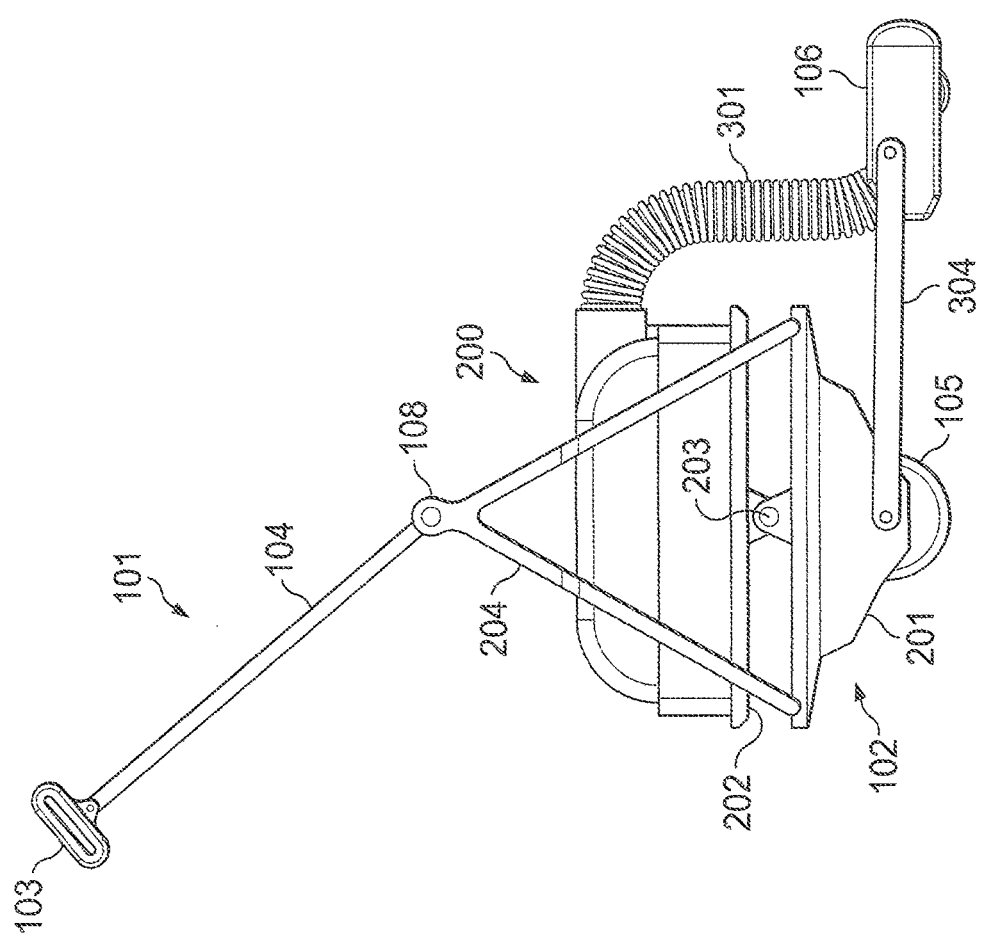
FIG. 2*a* is a side-view of an embodiment of the present invention adapting a cordless handheld vacuum and having separated mounting and drive platforms.

FIG. 2*a* is a side-view of an embodiment of the present invention 200 which couples a cordless handheld vacuum 202 to a separated mounting and drive platform 201. FIG. 2*b* is a rear view of the embodiment 200 of the present invention of FIG. 2*a*. As seen in FIGS. 2*a* and 2*b*, pivoting bar 304 holds the cleaner vacuum head 106 a distance in front of the SLP 201 and allows the SLP 201 to freely tilt back and forth.

Further referring to FIG. 2*b*, the drive wheel 105 is dimensioned such that the diameter of the wheel outer surface is at a maximum at its center, width-wise, said diameter decreasing slightly with distance from said center to each side, said wheel resembling the joining of lower portions of two identical cones at their bases, said cones being oriented in opposite directions. This wheel geometry provides a smaller contact area between the wheel and the ground, said contact area being vertically aligned with the combined center of mass of the SLP, TJS, and vacuum unit. Said TJS 101 comprises a tactile control rod (TCR) 104 and tactile control handle (TCH) 103, and TJS pivot 108.

The self-leveling platform (SLP) 102 and associated SLP onboard processor, memory, inertial measurement unit (IMU), control software in the form of a set of sequential instructions stored in said memory to be executed by said processor, onboard or external power supply, drive wheel, and driving motor function such that said SLP, lacking user input, attempts to maintain a quasi-equilibrium orientation with the housing level such that a normal vector extending upward from the upper surface of said housing is aligned with inertial vertical. Said IMU comprises one or more accelerometers and/or gyroscopes mounted along body axes such that they measure acceleration of said SLP in the forward/backward and vertical body-fixed axes, and rotation about the drive wheel rotational axis.

In an embodiment, said IMU is self-contained and comprises its own IMU processor and memory operable to estimate, maintain, and propagate a state vector, and to output said state vector to said SLP onboard processor when required, said state vector comprising quantities of interest describing SLP position, velocity, and acceleration along the inertial forward/backward movement axis, angle of tilt about said drive wheel axis of rotation, rotational velocity of said angle of tilt, and rotational acceleration of said angle of tilt. In another embodiment, said IMU comprises only sensors and signal handling/conditioning electronics and said SLP onboard processor is operable to estimate, maintain, and propagate a state vector.

The steerable tractor powered unit (STPU) has its center of mass positioned approximately above said single drive wheel. Additionally, referring to FIG. 2, said vacuum unit 200 is attached to said mounting platform 202 which is coupled to said housing 201 via a freely-pivoting swivel joint 203 having its axis of rotation parallel to the axis of rotation of the single drive wheel 105. Said TJS pivot 108 consists of a rotating pivot coupling said TJS 101 to said housing 201 via support struts 204 extending upward from the left and right sides of said housing, said support struts being dimensioned to admit said mounting platform 202 and vacuum unit 200 between them, said support struts meeting at a point above said vacuum unit 200, said TJS pivot 108 having its rotation axis parallel to the axis of rotation of said single drive wheel 105.

Referring to FIG. 2b, said SLP comprises a brush head 106 which is of sufficient width to provide lateral stability to the STPU. Swivel joint 203 allows for rotation of the mounting platform 202 and housing 201 relative to each other about the swivel joint rotation axis. The mounting platform 202 is stable due to its three points of contact: contact with the housing at said swivel joint 203, and contact at the two lateral ends of the brush head 106. Because the swivel joint is approximately vertically in line with the STPU center of mass and the axis of rotation of the single drive wheel 105, the combined mounting platform/vacuum unit maintains an approximately level orientation regardless of the drive platform orientation. The housing is coupled to said mounting platform via said freely-pivoting swivel joint 203 and to said tactile joystick staff (TJS) 101 via said TJS pivot 108. Said drive platform has only one point of contact with the ground through said single drive wheel. Additionally, the center of mass being located above the single drive wheel axis of rotation causes said SLP to act as an inverted pendulum in that any external force which would cause the housing upper surface normal vector to offset from inertial vertical, tipping said housing in a given direction, must be compensated by the movement of the SLP in said direction in an attempt to maintain equilibrium, said movement being determined via said onboard processor, IMU, and control software, and actuated via said driving motor coupled to said drive wheel. Due to the swivel joint 203 between the mounting platform and housing and its position in line vertically with the STPU center of mass, the weight of the mounting platform and vacuum unit do not contribute to the tipping forces; only user input via pushing or pulling on the tactile joystick staff contributes to tipping forces and thus movement of the self-leveling platform and STPU.

Besides platform motion required for self-leveling, additional desired forward or backward motion is commanded by the user via manipulation of said tactile control handle (TCH) 103 and other controls embedded therein. Said TCH 103 comprises, in one embodiment, an on/off switch coupled to said SLP via a wireless communication means such as Bluetooth or 2.4 GHz radio. In one embodiment, control signals from user manipulation of said TCH 103 and TCR 104 are transmitted via a wireless communication means such as Bluetooth or 2.4 GHz radio between the TJS 101 and SLP 102. In another embodiment, control signals from user manipulation of said TCH 103 and TCR 104 are transmitted directly via signal wiring through said TJS pivot 108 and support struts 204 to said SLP 102.

In a preferred embodiment, said wireless or direct control signals are sent to an onboard processor in said SLP. Said IMU combines sensor output from one or more accelerometers and/or gyroscopes with a system dynamics model using a Kalman filter or similar algorithm to calculate a state estimate, said state estimate including any or all of SLP position, velocity, acceleration along the inertial forward/backward movement axis, and SLP angle of tilt, rotational velocity of said angle of tilt, rotational acceleration of said angle of tilt about the drive wheel axis of rotation. Said onboard processor then determines through control software the required drive wheel motion to maintain SLP balance while responding to user control inputs and translates said required drive wheel motion into motor commands, said motor commands then being transmitted directly to said driving motor. Lateral balancing systems are unnecessary due to the alignment of the pivot, swivel, and drive wheel rotation axes, and the lateral stability afforded by the width of the brush head.

Note that the maximum allowed tipping angle of the SLP from a vertical quasi-equilibrium in the embodiment shown in FIG. 2 is constrained by the distance between the mounting and drive platforms, in that tipping past this maximum allowed angle causes the mounting and drive platforms to contact each other, after which the mounting platform and attached vacuum unit cannot maintain a level orientation.

In an embodiment, the single drive wheel 105 is driven by a so-called in-hub motor, a configuration in which the driving motor is located within the width and circumference of the wheel. This configuration adds stability to the system and improves maneuverability by lowering and laterally-centering the mass of the motor.

In another embodiment, referring to FIG. 3, the SLP 302 comprises a housing having a vacuum unit mounted directly thereon, the combined SLP and vacuum unit rotating around pivot axis 300 which is equivalent to the rotation axis of the single drive wheel. A flexible hose 301 connecting the brush head to the vacuum unit allows the free rotation of the SLP and vacuum unit about pivot 300. This configuration allows for a larger range of SLP tipping angles. Tactile control handle (TCH) 103 is coupled to tactile control rod (TCR) 104 at interface 305. In one embodiment, interface 305 is a fixed, rigid connection and control is provided through rotation of TCS 104 about pivot 108, achieved through upward or downward movement of TCH 103 by a user, and rotation of the combined TJS, SLP, and vacuum unit about pivot 300, achieved through forward or backward movement of TJS handle 103 by a user, support 307 being rigidly attached to the SLP. In another embodiment, interface 305 is a pivot having one rotational degree of freedom about an axis parallel to the axis of rotation of pivot 108 and axis of rotation of wheel 105, control being provided through rotation of said TCH 103 about said pivot axis at interface 305. In a further embodiment, interface 305 is a pivot having two rotational degrees of freedom: one about an axis parallel to the axes of rotation of pivot 108 and wheel 105, and one about an axis aligned with TCR 104. Sensors interior to said interface measure and transmit motion of said TCH to said onboard processor.

In an embodiment, the vacuum unit further comprises a U-shaped handle 306 operable to carry entire combined steerable tractor powered unit (STPU) or vacuum unit 200 alone, said vacuum unit 200 being portable and detachable from said SLP 302 via quick-release clips or latches on the SLP mounting surface, said clips or latches having complementary slots or attachment points located on said vacuum unit.

In another embodiment, the SLP is attached to pivoting pin connectors on the brush head 106 via connecting brackets 304, one each on the left and right sides, such that said brush head is maintained at a fixed distance from said SLP while a flexible brush head hose connector 301 allows said SLP and vacuum unit to freely rotate about pivot 300.

In a further embodiment, referring to FIG. 4, the housing 201 comprises a set of support bars 404 in a yoke configuration extending from the sides of the housing upwards, said support bars meeting at a TJS pivot 108, said bars being dimensioned to accommodate a removeable vacuum unit 405 attached to a mounting platform 202 between them.

In another embodiment, said support bars 404 further comprise a handle rest 400 extending therefrom, said handle rest comprising a magnetic or physical latching mechanism to maintain the tactile joystick staff (TJS) 101 in a stowed position, said stowed position achieved by rotating said TJS 101 clockwise about pivot 108 until it contacts said handle rest 400. FIG. 4 further discloses a rigid restraining brace 406. A flexible tube joint 407 is interposed between ingress tube 402 and cleaning head 106. This flexible tube joint 407 is operable to allow cleaning head 106 to stay in contact with the floor when the SLP 201 is tilted back and forth.

In any embodiment adapting a vacuum unit having both a primary floor brush head and secondary flexible hose, said vacuum unit further comprises a diverter valve 403, said diverter valve comprising a valve handle, suction source, primary inlet from primary floor brush head hose 402, and secondary inlet from flexible secondary hose 401; said valve handle is manipulated to switch between secondary hose 401 and primary floor brush head hose 402, said secondary hose 401 allowing for use of accessories and for reaching tight, elevated, or otherwise hard-to-reach places.

Referring to FIG. 5, an additional embodiment adapts a canister-type vacuum 500 such that the entire unit rests on the SLP, said SLP further comprising a storage rack 502 on which the extended hose 501 is coiled for storage, said extended hose 501 and a flexible hose 402 leading to a floor brush head unit being connected to a diverter 403. FIG. 5 includes a rigid bar between the cleaning head and the SLP. A rigid bar is not needed if the connecting vacuum hose between the canister-type vacuum 500 and the cleaning head is rigid.

Figure 6:
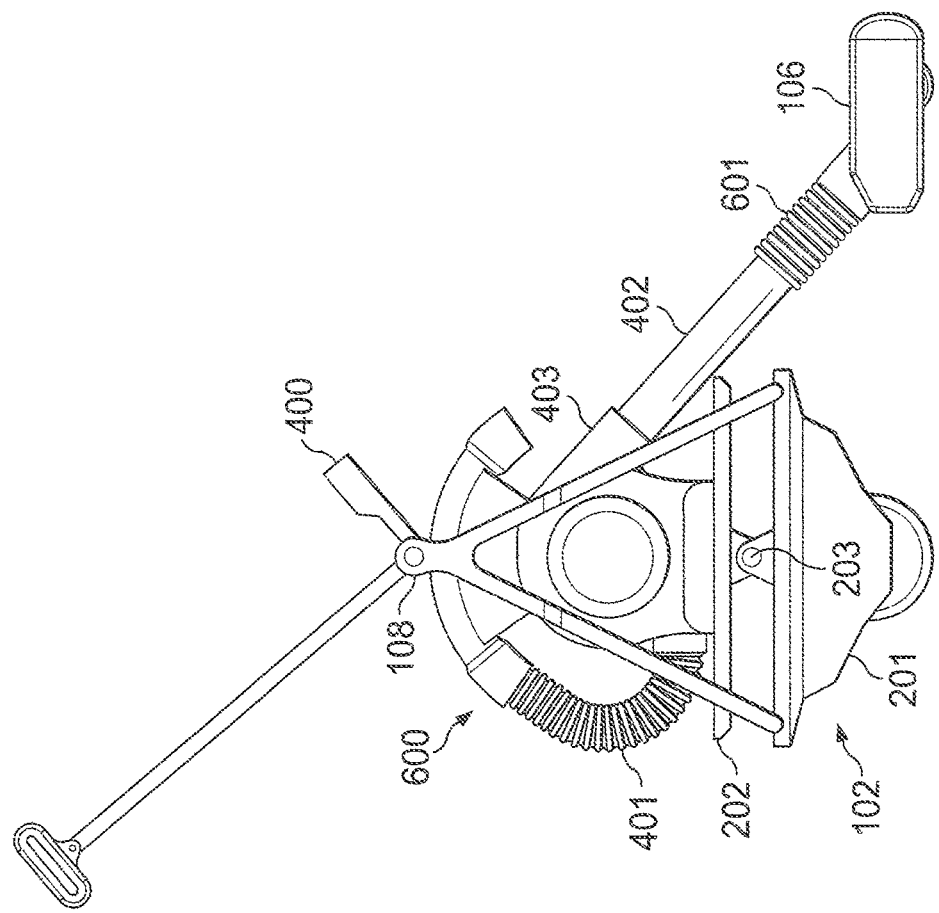
FIG. 6 is a side-view of an embodiment of the present invention adapting a stick vacuum and having separated mounting and drive platforms.

Referring to FIG. 6, a further embodiment adapts a stick-type vacuum 600 to the self-leveling platform, connecting the rigid hose 402 and flexible hose 401 to a diverter 403 for easy switching between the two. With the vacuum unit 600 resting on the mounting platform 202, the cleaner head unit 106 attached to extensible rigid hose 402 provides the additional two points of contact at the lateral ends of said brush head necessary for system balance. As seen in FIG. 6, the vacuum will hold the vacuum head 106 against the floor. A flexible tube joint 601 is interposed between rigid hose 402 and cleaner head unit 106.

Figure 7:
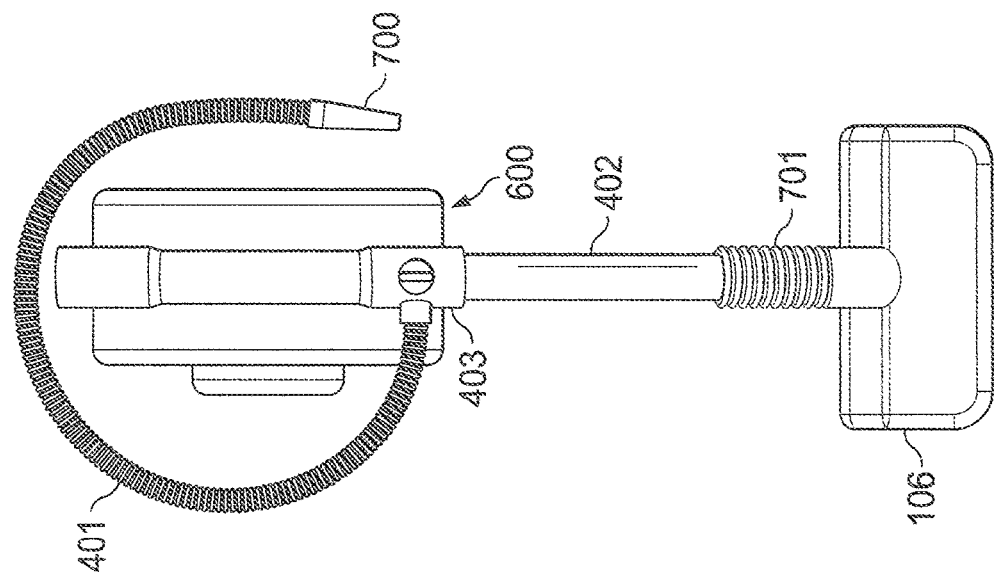
FIG. 7 is a simplified top-down view of the vacuum unit of FIG. 6 in one embodiment of the present invention illustrating the diverter valve.

Referring to FIG. 7, a diverter valve 403 allows for fast switching between the rigid hose 402 coupled to brush head 106 and the flexible hose 401 coupled to a hose attachment 700 such as a nozzle. Said diverter valve is actuated by rotating 90 degrees a knob or dial coupled to a T-valve, connecting the suction source to one of two inlets. In another embodiment, in place of a single diverter valve, the tubes leading to the brush head and secondary flexible hose each comprise simple flow-stopping valves such as ball valves, flow diversion then being achieved by opening both valves and closing off flow to the unwanted hose. The embodiment of FIG. 7 does not require a bar between SLP 201 and cleaning head 106 if the connecting vacuum hose 402 is rigid to the cleaning head 106. As seen in FIG. 7, flexible joint 601 is provided between vacuum hose 402 and cleaning head 106.

In another embodiment, said self-leveling platform (SLP) is a dual-wheeled platform comprising a housing, independently-driven wheels having colinear axes of rotation, a driving motor coupled to each drive wheel, onboard processor, memory, control software in the form of a set of sequential instructions stored in said memory to be executed by said processor, inertial measurement unit (IMU) comprising sensors including one or more accelerometers and/or gyroscopes, and a battery or external power supply. The self-leveling platform (SLP) and associated SLP onboard processor, memory, IMU, control software, power supply, drive wheels, and driving motors function such that said SLP, lacking user input, attempts to maintain a quasi-equilibrium orientation with the housing level such that a normal vector extending upward from the upper surface of said housing is aligned with inertial vertical. Said IMU comprises sensors including one or more accelerometers and/or gyroscopes mounted along body axes such that they measure acceleration of said SLP in the forward/backward and vertical body-fixed axes, and rotation about the dual drive wheel rotational axis. In an embodiment, said IMU is self-contained and comprises its own IMU processor and memory operable to estimate, maintain, and propagate a state vector, and to output said state vector to said SLP onboard processor when required, said state vector comprising quantities of interest describing SLP position, velocity, and acceleration along the inertial forward/backward movement axis, angle of tilt about said dual drive wheel axis of rotation, rotational velocity of said angle of tilt, and rotational acceleration of said angle of tilt. In another embodiment, said IMU comprises only sensors and signal handling/conditioning electronics and said SLP onboard processor is operable to estimate, maintain, and propagate a state vector. The SLP with attached vacuum unit has its center of mass positioned approximately above said dual drive wheel rotation axis.

Said SLP dual drive wheels are independently driven and rotatable but share an axis of rotation about which said SLP can pivot. Additionally, the center of mass being located above this pivot point causes said SLP to act as an inverted pendulum in that any external force which would cause the drive platform upper surface normal vector to offset from vertical, tipping said drive platform in a given direction, must be compensated by the movement of the SLP in said direction in an attempt to balance said platform, said movement being determined via said onboard processor, IMU, and control software, and actuated via said driving motor coupled to said drive wheel. Besides platform motion required for self-leveling, additional desired forward or backward motion is commanded by the user via manipulation of said tactile control handle (TCH) and other controls embedded thereon. Said TCH comprises, in one embodiment, an on/off switch coupled to said SLP via a wireless communication means such as Bluetooth or 2.4 GHz radio. In one embodiment, control signals from user manipulation of said TCH and TCR are transmitted via a wireless communication means such as Bluetooth or 2.4 GHz radio between the TJS and SLP. In another embodiment, control signals from user manipulation of said TCH and TCR are transmitted directly via signal wiring through said TJS pivot and support struts to said SLP.

In said dual-drive wheel embodiment, said wireless or direct control signals are sent to an onboard processor in said SLP. Said IMU combines sensor output from one or more accelerometers and/or gyroscopes with a system dynamics model using a Kalman filter or similar algorithm to calculate a state estimate, said state estimate including any or all of SLP position, velocity, acceleration along the inertial forward/backward movement axis, and SLP angle of tilt, rotational velocity of said angle of tilt, rotational acceleration of said angle of tilt about the dual drive wheel axis of rotation. Said onboard processor then determines through control software the required drive wheel motion to maintain SLP balance while responding to user control inputs and translates said required drive wheel motion into motor commands, said motor commands then being transmitted directly to said driving motor. Said wheels are driven in the same direction, as if sharing an axle, to actuate STPU motion in a forward or backward movement direction. Said wheels are driven in opposite directions to actuate powered steering.

In a further embodiment, said SLP further comprises on its mounting surface one or more quick-release clips or latches corresponding to complementary slots or latches on a vacuum unit such that said vacuum unit can be removably secured to said mounting surface, said clips being operable to release said vacuum unit when actuated, said vacuum unit then being usable as a portable vacuum cleaner.

In an additional embodiment, the upper surface of said SLP comprises charging contact points corresponding to complementary charging contacts on the lower surface of said vacuum cleaner such that when said vacuum cleaner is attached to said SLP, the charging contacts are operable to transfer electric power from the power supply of said SLP, said power supply being external or onboard batteries, to said vacuum cleaner.

The invention is further described as a steerable tractor powered vacuum unit comprising a self-leveling platform coupled to a tactile joystick staff said self-leveling platform further comprising a housing, onboard processor coupled to a nonvolatile memory and a volatile memory, sensors coupled to the onboard processor including one or more accelerometers and/or gyroscopes, control software in the form of sequential instructions stored in said nonvolatile memory to be loaded into the volatile memory and executed by said processor, a driving motor coupled to a drive wheel and powered by an onboard or external power supply, and mechanically supported by support struts; said onboard processor, volatile and non-volatile memory, sensors, control software, motor, and wheel being operable to maintain self-leveling platform at a desired orientation; said drive wheel being located approximately below the center of mass of said steerable tractor powered unit and being capable of moving said steerable tractor powered unit forward or backward; and said tactile joystick staff further comprising a tactile control handle, tactile control rod, tactile joystick staff interface, and tactile control handle interface; said tactile joystick staff being operable to command movement of said steerable tractor powered unit via user actuation of said tactile joystick staff interface and/or said tactile control handle interface.

Said tactile joystick staff interface has a rigid connection between said tactile control rod and said support struts, said support struts extending upward from said self-leveling platform. The tactile joystick staff interface is a pivot joint between said tactile control rod and said support struts allowing rotation about an axis parallel to the axis of rotation of said drive wheel, namely upward/forward/clockwise or downward/backward/counter-clockwise.

The support struts further comprise a handle rest having a fastening mechanism to maintain said tactile joystick staff in a stowed position when not in use. The fastening mechanism comprises a magnet embedded in said handle rest, said magnet removably securing said tactile joystick staff to said handle rest when said magnet contacts said tactile control rod. The tactile control handle interface is a fixed, rigid connection between said tactile control handle and said tactile control rod. The tactile control handle interface is a pivot joint between said tactile control handle and said tactile control rod allowing rotation about an axis parallel to the axis of rotation of said drive wheel.

The self-leveling platform further comprises a mounting platform coupled to the upper surface of said housing by a freely-rotating pin joint having an axis of rotation parallel to the axis of rotation of said drive wheel. The support struts connect said housing to said tactile joystick staff interface and are dimensioned to accommodate said mounting platform.

The steerable tractor powered unit further comprises a vacuum cleaner, said vacuum cleaner being attached to said mounting platform. The self-leveling platform further comprises a brush head coupled to said vacuum cleaner by a rigid fixed-length tube, said brush head comprising a floor-facing opening, said vacuum cleaner impelling a dust-laden airstream inward through said opening via suction. The steerable tractor powered unit further comprises a vacuum cleaner.

The self-leveling platform further comprises on its upward-facing surface a plurality of quick-release latches corresponding to complementary geometry on said vacuum cleaner such that said vacuum cleaner can be removably attached to said self-leveling platform upper surface.

The self-leveling platform further comprises a brush head coupled to said vacuum cleaner by a primary flexible hose, said brush head comprising a floor-facing opening, said vacuum cleaner impelling a dust-laden airstream inward through said opening via suction.

The self-leveling platform further comprises lateral support brackets attached via pin joints to the sides of said self-leveling platform and brush head, such that said brush head is maintained at a fixed distance from said self-leveling platform.

The present invention further comprises a secondary flexible hose attachment and a diverter valve operable to switch vacuum suction between said brush head and said secondary flexible hose attachment by 90 degree rotation of said diverter valve. The present invention further comprises a secondary flexible hose attachment, said secondary hose attachment and primary flexible hose being coupled to a manifold and each comprising a ball valve which can be rotated 90 degrees to stop flow through the associated hose.

The present invention can comprise a handheld-type vacuum cleaner, said vacuum cleaner being attached to the upper surface of said self-leveling platform housing. The present invention can further implement a canister-type vacuum cleaner wherein said canister-type vacuum cleaner is attached to the upper surface of said self-leveling platform housing. Further said vacuum cleaner canister can be located on the floor and coupled to said brush head via flexible hose coupled to a manifold, said manifold being attached to the upper surface of said self-leveling platform housing. The present invention further embodies a wet/dry vacuum cleaner, said vacuum cleaner being attached to the upper surface of said self-leveling platform housing.

The present invention further comprises a steerable tractor powered unit comprising a self-leveling platform, tactile joystick staff, and vacuum cleaner; said self-leveling platform further comprising a housing, onboard processor, nonvolatile memory, sensors including one or more accelerometers and/or gyroscopes, control software in the form of sequential instructions stored in said memory to be executed by said processor, a driving motor coupled to a drive wheel, onboard or external power supply, and support struts; said processor, memory, sensors, control software, motor, and wheel being operable to maintain self-leveling platform at a desired orientation; said drive wheel being located approximately below the center of mass of said steerable tractor powered unit and being capable of moving said steerable tractor powered unit forward or backward; said self-leveling platform further comprising a mounting platform coupled to the upper surface of said housing by a freely-rotating pin joint having an axis of rotation parallel to the axis of rotation of said drive wheel; said tactile joystick staff further comprising a tactile control handle, tactile control rod, tactile joystick staff interface, and tactile control handle interface; said tactile joystick staff interface having a pivot joint between said tactile control rod and said support struts allowing rotation about an axis parallel to the axis of rotation of said drive wheel; said tactile control handle interface is a pivot joint between said tactile control handle and said tactile control rod allowing rotation about an axis parallel to the axis of rotation of said drive wheel; said tactile joystick staff being operable to command movement of said steerable tractor powered unit via user actuation of said tactile joystick staff interface and/or said tactile control handle interface; said vacuum cleaner being attached to said mounting platform; said support struts connecting said housing to said tactile joystick staff interface and being dimensioned to accommodate said vacuum cleaner and mounting platform between them; said self-leveling platform further comprising a brush head coupled to said vacuum cleaner via rigid tube, said brush head comprising a floor-facing opening, said vacuum cleaner impelling a dust-laden airstream inward through said opening via suction.

Such self-leveling platform further comprises on its upward-facing surface a plurality of quick-release latches corresponding to complementary geometry on said vacuum cleaner such that said vacuum cleaner can be removably attached to said self-leveling platform upper surface. Said support struts further comprise a handle rest having a fastening means to maintain said tactile joystick staff in a stowed position when not in use. Said fastening means comprises a magnet embedded in said handle rest, said magnet removably securing said tactile joystick staff to said handle rest when said magnet contacts said tactile control rod. The foregoing invention can be embodied in any of a handheld-type vacuum cleaner, canister-type vacuum cleaner or wet/dry vacuum cleaner.

The invention further comprises a method for assembling and using the steerable tractor powered unit comprising the steps of attaching the vacuum cleaner to the upper surface of the self-leveling platform; attaching the tactile joystick staff to the support struts of the self-leveling platform; applying power to the steerable tractor powered unit; and controlling movement of the steerable tractor powered unit by manipulating the tactile control handle and tactile control rod.

The embodiments shown and described above are only exemplary. Even though numerous characteristics and advantages of the present invention have been set forth in the foregoing description, the disclosure is illustrative only and changes may be made within the principles of the invention to the full extent indicated by the broad general meaning of the terms used herein. Various alterations, modifications and substitutions can be made to the disclosed invention and the system that implements the present invention without departing in any way from the spirit and scope of the invention. For example, the vacuum units that are coupled or integrated with the SLP can be any vacuum used in a home or commercial setting or can be a wet or dry vacuum. The internal differences between the wet and dry vacuum are that the dry collection bag is removed, the collection container is water-proof and the fan and electrical connection are water-proof. Further, the floor facing cleaning head or brush head can be designed for any surface, such as wood, hardwoods, engineered hardwoods, vinyl flooring, shag rugs or carpets or non-shag rugs or carpets.

What is claimed is:

1. A steerable, self-leveling tractor powered vacuum cleaner comprising: a first motor driven vacuum unit: a self-leveling platform (SLP) coupled to the vacuum unit; a brush head coupled to said vacuum unit by a primary hose or tube, said brush head comprising a floor-facing opening, said vacuum unit impelling a dust-laden airstream inward through said opening via suction; a tactile joystick staff coupled to the SLP; said self-leveling platform (SLP) further comprising: a housing; an onboard processor coupled to a nonvolatile memory and a volatile memory; at least one sensor coupled to the onboard processor, said at least one sensors including one or more accelerometers and/or gyroscopes; control software in the form of sequential instructions stored in said nonvolatile memory to be loaded into the volatile memory and executed by said processor; a second motor coupled to a drive wheel, said second motor powered by an onboard or external power supply, said second motor mechanically supported by support struts, said support struts extending upward from said self-leveling platform; said onboard processor, volatile and non-volatile memory, at least one sensors, control software, second motor, and drive wheel being operable to maintain self-leveling platform at a desired orientation; said drive wheel being located approximately below the center of mass of said SLP and being capable of moving said SLP forward or backward; said tactile joystick staff operable to command movement of said SLP via user actuation of a tactile joystick staff interface between a tactile control rod and said support struts wherein said tactile joystick staff interface is a pivot joint between a tactile control rod and said support struts.

2. The steerable, self-leveling tractor powered vacuum cleaner of claim 1, wherein the pivot joint between the tactile control rod and said support struts is operable to allow rotation about an axis parallel to the axis of rotation of said drive wheel, in an upward, forward, clockwise or downward, backward, and counter-clockwise direction.

3. The steerable, self-leveling tractor powered vacuum cleaner of claim 1, in which said support struts further comprise a handle rest having a fastening mechanism to maintain said tactile joystick staff in a stowed position when not in use.

4. The steerable, self-leveling tractor powered vacuum cleaner of claim 3, in which said fastening mechanism comprises a magnet embedded in said handle rest, said magnet removably securing said tactile joystick staff to said handle rest when said magnet contacts said tactile control rod.

5. The steerable, self-leveling tractor powered vacuum cleaner of claim 1, in which said tactile control handle interface is a pivot joint between said tactile control handle and said tactile control rod allowing rotation about an axis parallel to the axis of rotation of said drive wheel.

6. The steerable, self-leveling tractor powered vacuum cleaner of claim 1, in which said SLP further comprises a mounting platform coupled to the upper surface of said housing by a freely-rotating pin joint having an axis of rotation parallel to the axis of rotation of said drive wheel.

7. The steerable, self-leveling tractor powered vacuum cleaner of claim 6, in which said support struts couple said housing to said tactile joystick staff interface and are dimensioned to accommodate said mounting platform.

8. The steerable, self-leveling tractor powered vacuum cleaner of claim 1, wherein said vacuum unit is one selected from a wet vacuum unit or a dry vacuum unit.

9. The steerable, self-leveling tractor powered vacuum cleaner of claim 1, wherein said brush head includes at least one brush adapted for any of wood, hardwood, engineered wood, vinyl, shag rug or carpet or non-shag rug or carpet.

10. The steerable, self-leveling tractor powered vacuum cleaner of claim 1, further comprising a mounting platform coupled to the upper surface of said housing by a freely-rotating pin joint having an axis of rotation parallel to the axis of rotation of said drive wheel, said vacuum unit is attached to said mounting platform.

11. The steerable, self-leveling tractor powered vacuum cleaner of claim 10, in which said SLP further comprises on its upward-facing surface a plurality of quick-release latches corresponding to complementary geometry on said vacuum unit such that said vacuum unit can be removably attached to said self-leveling platform upper surface.

12. The steerable, self-leveling tractor powered vacuum cleaner of claim 1, in which said brush head is coupled to said vacuum unit by a primary rigid tube, said brush head comprising a floor-facing opening, said vacuum unit impelling a dust-laden airstream inward through said opening via suction.

13. The steerable, self-leveling tractor powered vacuum cleaner of claim 1, in which said brush head is coupled to said vacuum unit by a primary flexible hose, said brush head comprising a floor-facing opening, said vacuum unit impelling a dust-laden airstream inward through said opening via suction.

14. The steerable, self-leveling tractor powered vacuum cleaner of claim 13, in which said SLP further comprises lateral support brackets attached via pin joints to the sides of said SLP and brush head, such that said brush head is maintained at a fixed distance from said SLP.

15. The steerable, self-leveling tractor powered vacuum cleaner of claim 1, wherein said vacuum unit further comprises a secondary flexible hose attachment and a diverter valve operable to switch vacuum suction between said brush head and said secondary flexible hose attachment by a 90 degree rotation of said diverter valve.

16. The steerable, self-leveling tractor powered vacuum cleaner of claim 1, in which said vacuum cleaner further comprises a secondary flexible hose attachment, said secondary hose attachment and primary flexible hose being coupled to a manifold and each comprising a ball valve which can be rotated 90 degrees to stop flow through the associated hose.

17. The steerable, self-leveling tractor powered vacuum cleaner of claim 1, in which said vacuum unit is a handheld-type vacuum unit, said vacuum unit being attached to the upper surface of said SLP.

18. The steerable, self-leveling tractor powered vacuum cleaner of claim 1, in which the vacuum unit is a canister-type vacuum cleaner coupled to the upper surface of said SLP housing.

19. The steerable, self-leveling tractor powered vacuum cleaner of claim 1, in which said vacuum unit has at least one wheel in communication with the floor and is coupled to said brush head via flexible hose which traverses a manifold, said manifold being attached to the upper surface of said SLP housing.

* * * * *